(12) United States Patent
Ekdahl et al.

(10) Patent No.: US 6,920,700 B2
(45) Date of Patent: Jul. 26, 2005

(54) OFFSET TAPE MEASURE

(75) Inventors: Kevin Allen Ekdahl, Libertyville, IL (US); Russell A. Goldmann, II, Highland Park, IL (US); Kingston T. Wong, Schaumburg, IL (US)

(73) Assignee: Klein Tools, Inc., Skokie, IL (US)

( * ) Notice: Subject to any disclaimer, the term of this patent is extended or adjusted under 35 U.S.C. 154(b) by 0 days.

(21) Appl. No.: 10/459,937

(22) Filed: Jun. 12, 2003

(65) Prior Publication Data

US 2004/0031166 A1 Feb. 19, 2004

Related U.S. Application Data

(63) Continuation-in-part of application No. 10/191,736, filed on Jul. 9, 2002, now abandoned.

(51) Int. Cl.[7] .............................................. G01B 3/10
(52) U.S. Cl. .......................................... 33/759; 33/494
(58) Field of Search ...................... 33/759, 1 G, 1 SB, 33/494, 755

(56) References Cited

U.S. PATENT DOCUMENTS

| | | | | |
|---|---|---|---|---|
| 888,233 A | * | 5/1908 | Gammon ...................... | 33/494 |
| 1,643,166 A | | 8/1927 | Martin | |
| 1,754,903 A | * | 4/1930 | Nearing ...................... | 33/494 |
| 2,389,369 A | | 11/1945 | Kittleson | |
| 3,270,421 A | * | 9/1966 | Jones .......................... | 33/759 |
| 3,824,696 A | | 7/1974 | McClay, Jr. | |
| 3,863,348 A | | 2/1975 | Herbst | |
| 4,301,596 A | | 11/1981 | Sedlock | |
| 4,696,110 A | | 9/1987 | Walker et al. | |
| 4,811,489 A | | 3/1989 | Walker | |
| 5,012,590 A | * | 5/1991 | Wagner et al. ................ | 33/759 |
| 5,230,158 A | * | 7/1993 | Wall ........................... | 33/759 |
| 5,251,382 A | | 10/1993 | Hellar ......................... | 33/759 |
| 5,575,506 A | * | 11/1996 | Gardenhour et al. .......... | 281/39 |
| 5,724,747 A | | 3/1998 | Poorman ..................... | 33/759 |
| 5,809,662 A | * | 9/1998 | Skinner ....................... | 33/768 |

FOREIGN PATENT DOCUMENTS

GB 2213936 A * 8/1989 ............ G01B/3/10

OTHER PUBLICATIONS

The Trubend 45 Offset Calculating Tape Measure by Richard A. Cox date unknown.*
Richard A. Cox, *Electricians Guides to Conduit Bending*, Book.

* cited by examiner

Primary Examiner—Christopher W. Fulton
(74) Attorney, Agent, or Firm—Cook, Alex, McFarron, Manzo, Cummings & Mehler, Ltd.

(57) ABSTRACT

An offset tape measuring tool marked with standard English measurements includes integrated indicia for quick determination of distance between bends for a given offset depth and offset angle when installing conduit. Additional indicia may be included for the measurement of the shrinkage of the conduit with respect to the specified offset depths and angles. The integrated invention may be part of a standard tape measure strip to provide a convenient multi-purpose tool. Although the tool eliminates any external calculations or table reference typically necessary when bending conduit to clear an obstacle, it still provides an optional reference card for unique bends.

21 Claims, 6 Drawing Sheets

O = offset, A = bend dist., b = shrink, X° = ∠

OFFSET TAPE MEASURE

CROSS REFERENCE TO RELATED APPLICATION

This application is a continuation-in-part, and, therefore, claims benefit under 35 U.S.C. § 120 of U.S. patent application Ser. No. 10/191,736, filed Jul. 9, 2002 now abandoned.

BACKGROUND OF THE INVENTION

The present invention relates generally to a measuring strip, and more particularly to a strip that may be used to measure offsets in rigid steel conduit, electrical metallic tubing, galvanized rigid conduit, rigid aluminum conduit and the like.

When installing conduit to house runs of conductors, the installer inevitably will need to make bends in the conduit run in order to navigate around obstacles. Bends of various shapes are usually needed, such as right angle or 90-degree bends, offsets and saddles. Most, if not all, of these bends will be made on the job as part of the installation procedure and are, therefore, known as field bends.

Before these field bends are actually made, it is essential that the installer do some careful planning. As each bend in the run adds to the friction caused when pulling the conductors, the NEC allows for only a total of 360 degrees of bends between pull points. As more bends are made, more pull points are required. This accordingly will affect the required labor to install the conductors, and ultimately affects the schedules and profits of the job. Therefore, it is good practice for the installer to walk the entire route before any conduit is installed, especially when dealing with longer runs with difficult conductor installation.

The schedules and profits of the job are further affected by the labor and material costs involved in the installation of the conduit, and, as such, accurate measurements are crucial. While installing electrical conduit for example, it will be necessary to calculate the correct length for a specific run. Because most installations are typically not straight runs, these bends must be made to navigate around obstructions to ensure a precise fit. When two opposing bends that are equal in the degree of their angle are used to clear an obstacle and maintain a course parallel to the original course, it is called an offset bend. In other words, and assuming both bends have the same angle measure, an offset bend is used when an obstruction requires a change in the conduits' plane.

Before making an offset bend, the installer must choose the most appropriate angle for the offset. Although this angle may be primarily chosen with respect to the offset depth, shallow bends will make for easier conductor pulling, while steeper bends will conserve space. Additionally, the installer must also consider that the conduit will shrink due to this detour. This shrinkage or take-up may possibly be ignored if working away from the obstruction, but certainly must be considered when working into the obstruction.

After the installer determines the offset depth and offset angle necessary to clear the obstacle, he will then typically refer to an offset multiplier table to calculate the required distance between conduit bends to achieve the desired dimensions. An example of such an offset multiplier calculation is illustrated below in Table 1.

TABLE 1

Offset Multiplier
Offset Depth × Constant Multiplier = Distance between bends

| Column 1 ANGLE | Column 2 MULTIPLIER | Column 3 SHRINK PER INCH OF OFFSET DEPTH |
|---|---|---|
| 10° × 10° | 6 | ¹⁄₁₆" per inch |
| 22½° × 22½° | 2.6 | ³⁄₁₆" per inch |
| 30° × 30° | 2 | ¼" per inch |
| 45° × 45° | 1.4 | ⅜" per inch |
| 60° × 60° | 1.2 | ½" per inch |

To use this table, the installer locates the measured offset angle on the left or first column, then taking the corresponding multiplier constant of column 2, he multiplies this constant by the measured depth of the offset to determine the distance between the offset bends. For example, if the depth of the offset is 5" and the offset angle is 30°, then, according to the Table, 30° corresponds to a 2 constant so that the distance between bends is 5"×2 or 10". The table further provides for the corresponding shrinkage due to the detour. In this example, the shrinkage (column 3) is 5"×¼" per inch or 1 ¼ shrinkage.

Tables such as those illustrated by Table 1 certainly aid the installer that encounters the prescribed offset angles depicted by such tables. However, if the installer encounters an offset angle that is not depicted in his table, he must either approximate the measurement or determine the exact distance between bends through the use of trigonometry. As the multiplier constant in these tables is the cosecant of the angle of offset, a complete chart of Natural Trigonometric Functions illustrates all of the constants for any particular degree of offset. Obviously, such a complete chart would hinder the installer at the job site, so smaller tables illustrating the most common offset angles are more commonplace.

In any event, this procedure, when used properly, is an adequate method for the offset bending of conduit runs, but it is often time consuming to refer to tables and make calculations as well as prone to error due to careless approximations. Whenever a mistake is made installing conduit it costs money both in the form of labor and materials. An invention that eliminates this error would be most beneficial to the art because it would eliminate the waste and added expense caused by such errors.

In light of the preceding problems, there has been an effort in the art to develop quick guides for installer use in bending conduit. One such effort, for example, has been developed to incorporate an offset calculator for 45° angles onto a standard tape measure strip. The Trubend™ 45° Offset Calculating Tape Measure attempts to accomplish this goal. Basically, the strip has a standard scale at the top of the rule by which the height of the obstruction is measured. The corresponding measurement on the bottom of the rule is used to measure the spacing between the 45° bends.

However, this method fails to incorporate easily readable pre-marked indicia that illustrate the correct distance between bends of known offset depths and angles. While it does have an offset multiplier table on the back side of the strip for other angles, the installer still must find the correct multiplier constant, make a calculation, and then re-measure for the correct distance.

Other attempts to reduce human error when determining the lengths of piping required for given angles are shown in U.S. Pat. Nos. 2,389,369, 4,696,110, and 4,811,489. All three of these patents have indicia for standard measurement with some form of an additional table or indicia for determining lengths of pipes. Specifically U.S. Pat. Nos. 4,696,110 and 4,811,489 have disclosed tables for determining the take off(or shrinkage) of pipes when using elbow and 45° angle fittings. However, these inventions fail to satisfy the niche required for precise determination of the distance between conduit tubing bends for all of the most commonly used offset angles quickly and precisely.

In view of the aforementioned needs and the shortcomings of the prior art, it is, therefore, a general object of the present invention to provide a measuring strip that will provide typical measuring indicia with integrated indicia for precise measurement of the distance between bends required to allow a specified offset depth and offset angle for electrical conduit installation.

It is another object of the present invention to eliminate the need for additional separate reference tables for determining offset distances.

It is yet another object of the present invention to reduce error and waste created from incorrect approximations and calculations.

Still another object of the present invention is to save time required to install conduit by eliminating steps required to determine the distances between offset bends.

Another object of the present invention is to provide a measuring strip that will provide typical measuring indicia with integrated indicia for the precise measurement of the shrinkage of conduit with respect to specified offset depths and angles.

These and other objects, features and advantages of the present invention will be clearly understood through a consideration of the following detailed description.

SUMMARY OF THE INVENTION

According to the present invention, there is provided an offset measuring device having a measuring strip with an upper surface with a plurality of numerical instrumental line markers spaced thereon. Offset indicia are spaced along some of the markers at measured offset depths and have a plurality of calculated criteria associated therewith. Such criteria including distance between offset bends and offset angle.

BRIEF DESCRIPTION OF THE DRAWINGS

The features of the present invention which are believed to he novel are set forth with particularity in the appended claims. The invention, together with the further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figure 1:
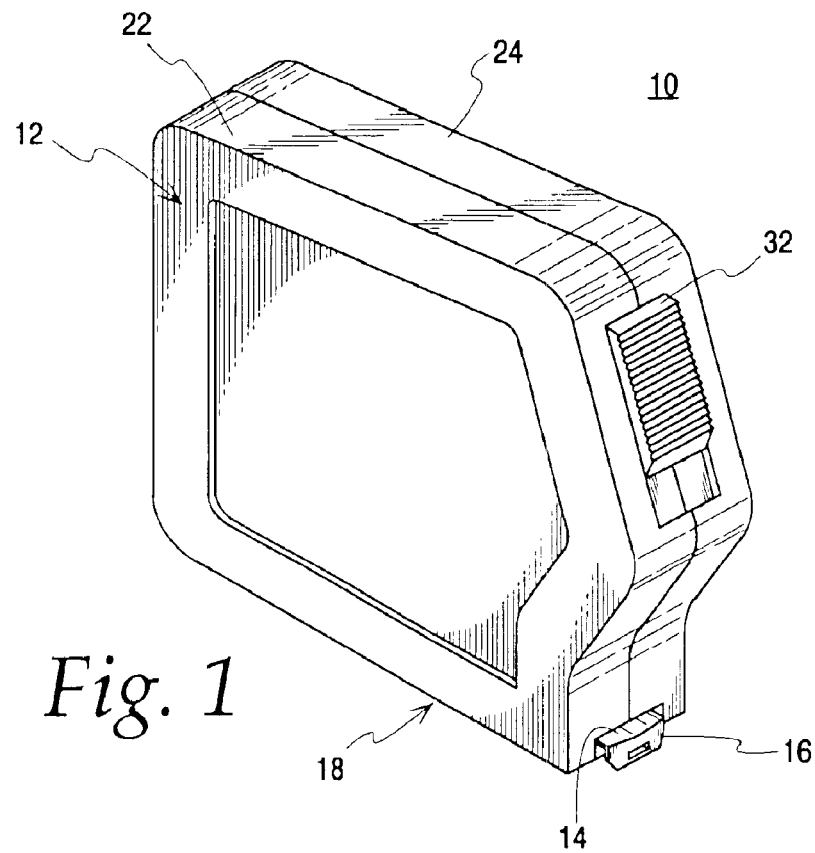
FIG. 1 is a perspective view of a preferred embodiment of the offset tape constructed in accordance with the principles of the present invention.
Figure 2:
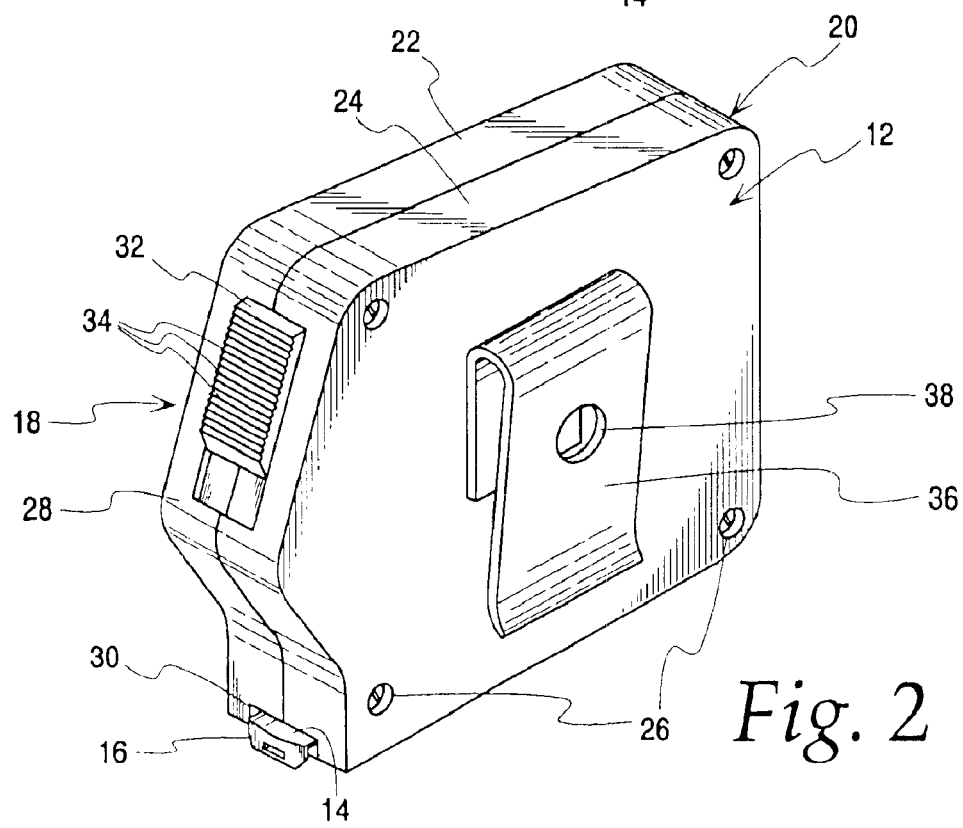
FIG. 2 is a rear perspective view of the housing illustrating the belt clip of the apparatus.

Referring now to the Figures, and in particular to FIGS. 1 and 2, a preferred embodiment of the offset tape measure embodying the principles and concepts of the present invention and generally designated by the reference numeral 10 will be described. Although the preferred embodiments will be described with respect to a retractable tape case, it will be appreciated that the present invention is applicable to any measuring device. For example, a folding rule, steel rule, wind-up flexible tape, wooden fixed rule, plastic fixed rule, markings on a level, or any other such markable device may be used. In any event, a preferred embodiment of the offset tape measure basically comprises a housing 12, a measuring tape 14 rolled and enclosed therein and a hook or flange member 16. More particularly, the housing 12 is formed in the conventional rectangular configuration with a front surface 18, a rear surface 20 and essentially hollow interior. The housing 12 is divided into front 22 and rear 24 halves coupled together by a plurality of screws 26.

The front side wall 28 has an aperture 30 extending through it and into the hollow interior. The front side wall further has an upper extent which includes a slidable switch or lock 32 coupled to it. This lock is movable in an upward or downward direction along the plane of the upper portion of the front wall. The lock further includes a plurality of grooves 34 to provide a firm gripping surface for the users thumb, for example. The housing may additionally include a belt clip 34 and/or a rope aperture 38.

The measuring tape 14 is formed in elongated planner rectangular configuration and will preferably be in measures of conventional distance. The tape 14 has an outboard end which includes a flange 16 which is positioned around an object when utilizing the apparatus. The tape 14 is linearly extendable from the housing 12 in an operative orientation. As the housing 12 includes a tape rolling means, the tape 14 is rolled within the hollow interior of the outer housing and operatively coupled to the tape rolling means in a stored orientation. Upon release of the tape 14 it retracts within the hollow interior of the housing.

Figure 3:
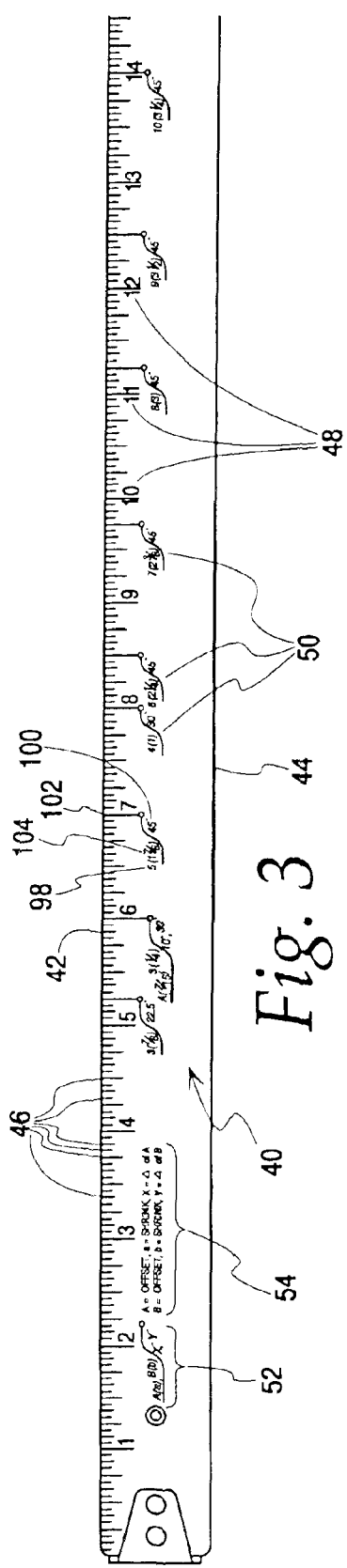
FIG. 3 is a top perspective view of the measuring tape of the apparatus illustrating the pre-marked indicia for offsets of varies degrees.

Referring now to FIG. 3, the tape 14 has an upper surface 40 with a top edge 42 and a bottom edge 44. The top edge including numerical instrumental line markers 46 spaced preferably 1/16 of an inch from each other. The top edge further including inch demarcation numerals 48 positioned at each one inch interval. Within the center portion of the upper surface 40 are spaced pre-marked offset indicia or symbols 50 along with a master symbol 52 with key or legend 54.

Figure 4:
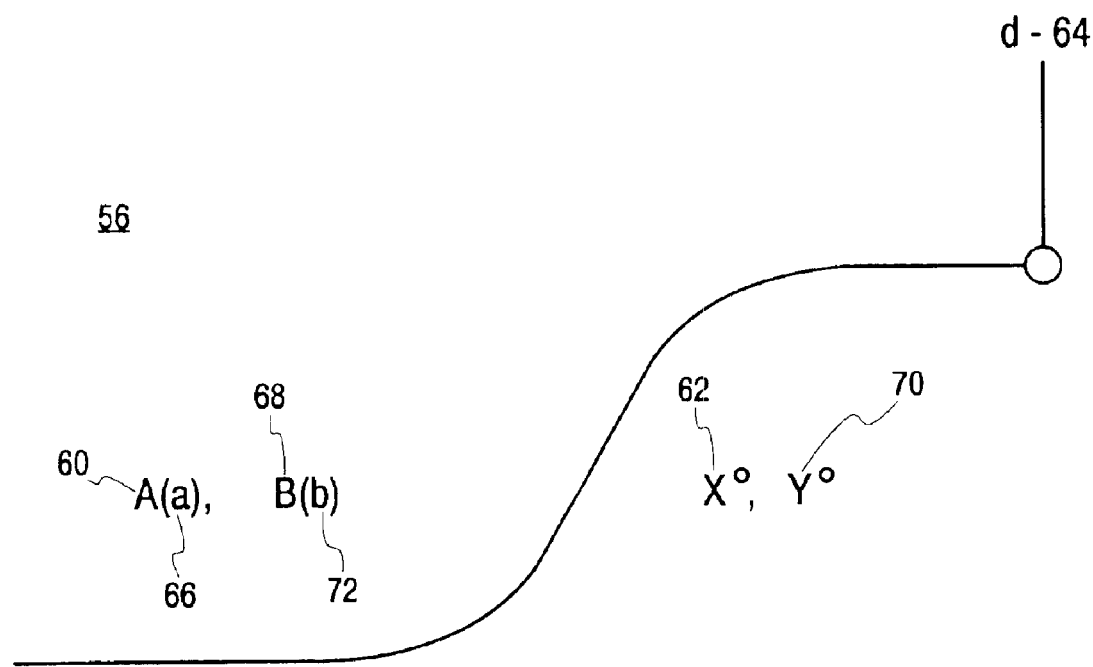
FIG. 4 is an enlarged view of a general indicia of FIG. 3.

An enlarged indicia 56 and key 58 are shown in FIG. 4 and with reference thereto, the present invention provides for multiple offset depths and angles in determining the distance required between offset bends of the conduit, as well as the associated shrinkage for each combination thereof. More particularly, offset depth "A" 60 with an offset angle of "X°" 62 requires the distance "d" 64 between bends, and a shrinkage of "a" 66. While offset depth "B" 68 with an offset angle of "Y°" 70 and a shrinkage of "b" 72 also requires the distance "d" 64 between bends. It will be appreciated that the present invention may use a single depth and angle measurement per indicia to indicate distance between bends markers, or may use more than two depth and angle measurements per indicia.

Figure 5:
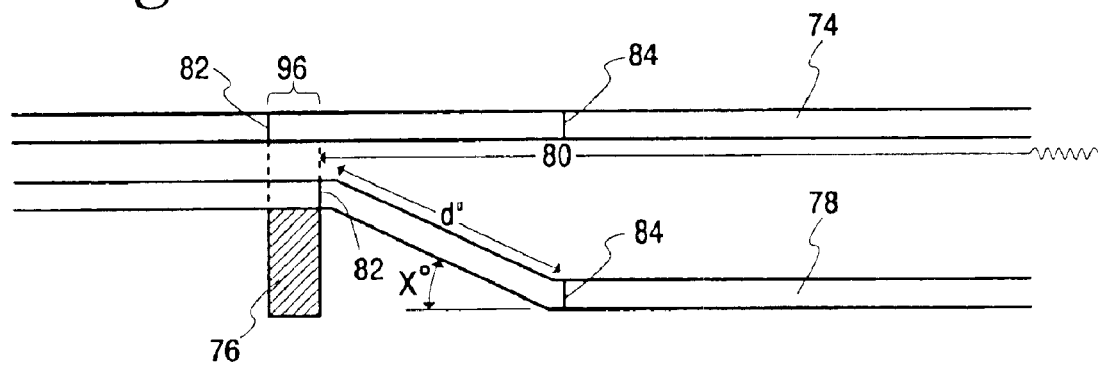
FIG. 5 is a top perspective view of a run of conduit before and after the offset bends are applied.

In practice, to cut down on labor and materials, the conduit installer desires to make straight runs from feed to feed, as the top run of conduit 74 of FIG. 5 illustrates. However, when an obstacle 76 is in the path of the run and the run is into the obstruction, one of the best solutions is the offset bend illustrated in the bottom run of conduit 78 in FIG. 5. The present invention provides a quick determination scheme whereby the installer first decides what offset angle and offset depth combination are necessary for the conduit to clear the obstacle and where to place the first bend. The location of the first bend is obtained by simply adding the distance to the obstruction 80 to the associated shrinkage "a" as indicated on the tape for that particular offset depth and angle combination. After marking the first bend 82 the measure 14 is placed such that the end of the tape 16 is at the mark for the first bend 82. The installer then finds the indicia on the tape to match up the specified offset depth with the offset angle as enlarged in FIG. 4. A mark can then be made at that point to delineate the second bend 84.

Figure 6:
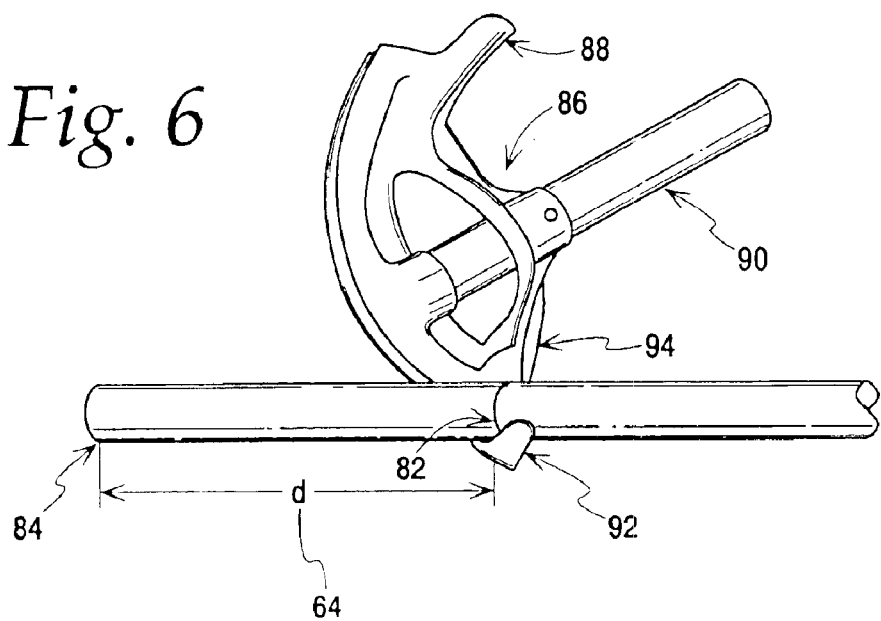
FIG. 6 is a side elevational view illustrating the marking and bending process with respect to a length of conduit.

Once properly marked using the principles of the present invention, the conduit can then be bent using conventional methods to produce the specified offset depth and offset angle. Such methods include mechanical benders, hydraulic benders and most commonly field foot benders. FIG. 6 illustrates a field foot bender 86 including a foot rest 88, handle 90, lip or hook 92 and bender arrow 94. The bender arrow 94 is aligned with the mark 82 for the First bend after the conduit is placed on the floor. One foot is placed on the footrest 88 and with the handle 90 in both hands, pressure is applied to the footrest as the handle is pulled until the bender reads the correct angle X° 62. The same procedure is used to bend the other side of the offset after the conduit is inverted on the floor. Once the bends are completed, the conduit can be installed around the obstacle 76, see run 78 of FIG. 5. Note that a certain distance of the run is lost when making the offset bends. This shrinkage or take-up distance 96 is dependant upon the angle used and depth of the offset. As discussed, this shrinkage must be taken into account when determining the total length of the conduit run.

As a practical example, assume the installer ran into an obstruction that required an offset depth of 5 inches and an offset angle of 45°. After the location of the first bend is determined, the tape measure strip 14 would be placed with the strip end 16 at the mark for the first bend. With the strip extended the installer would find the 5 inch offset mark 98 ("A") and then the 45° offset angle mark 100 (X°) as shown in FIG. 3. This point, 7" (102), is exactly where the mark needs to be made for the second bend. Note that in this example, the conduit will in effect shrink 1 ⅞" (104). By utilizing the indicia of the present invention, the installer has bypassed having to took up a multiplier, make a calculation and then re-measure to mark the second bend.

The most frequently used angles are shown in FIG. 3. While it is understood that other variations of this depiction are within the scope of this invention, color-coding or any other means may be used to distinguish different offset angles or different offset depths to allow the strip to be used faster. Additionally, a second axis may be used on the bottom of the strip for an alternative scale such as metric. Furthermore, a small table may be included with the offset multipliers for unique depth and angle combinations.

Figure 7:
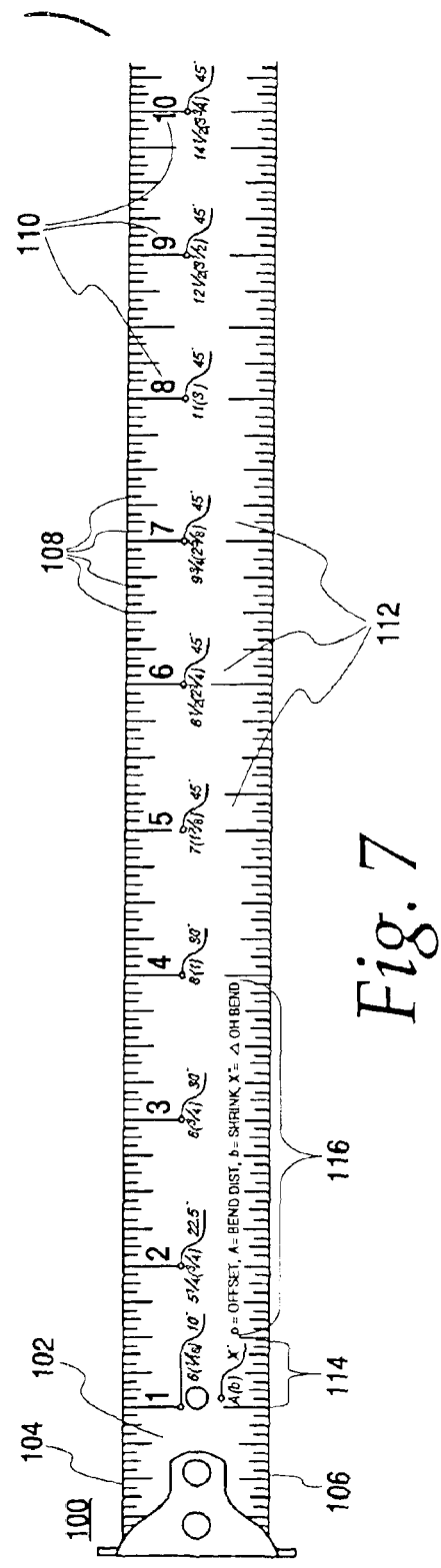
FIG. 7 is a top perspective view of the measuring tape of the apparatus illustrating an alternate pre-marked indicia of offsets of various degrees.
Figure 8:
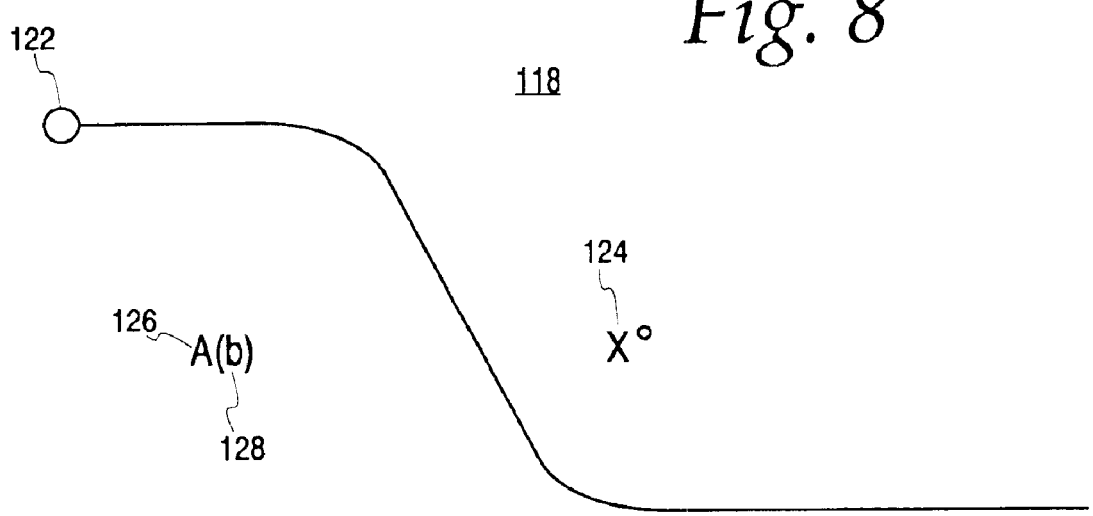
FIG. 8 is an enlarged view of the general indicia of FIG. 7.

An alternate preferred embodiment of the present invention is shown in FIGS. 7 and 8. Rather than marking the distance between bends, as shown in FIGS. 3 and 4, this embodiment marks the offset. More particularly, the tape 100 has an upper surface 102 with a top edge 104 and a bottom edge 106. The top edge including numerical instrumental line markers 108 preferably 1/16 of an inch from each other. The top edge further including inch demarcation numerals 110 positioned at each one inch interval. Within the center portion of the upper surface 102 are spaced pre-marked offset indicia or symbols 112 along with a master symbol 114 with key or legend 116.

An enlarged indicia 118 and key 120 are shown in FIG. 8 and with reference thereto, each inch demarcation numeral 110 of FIG. 7 can be described as it relates to certain calculated criteria. In particular, offset depth 122 requires an offset angle of "X°" 124 and the distance "A" 126 between bends, which results in a shrinkage of "b" 128.

In practice, the alternate preferred embodiment of FIGS. 7 and 8 provide the same quick determination scheme to mark the conduit as that shown in FIGS. 3 and 4 and as previously discussed. Once properly marked, the conduit can be bent using the same conventional methods.

Figure 9:
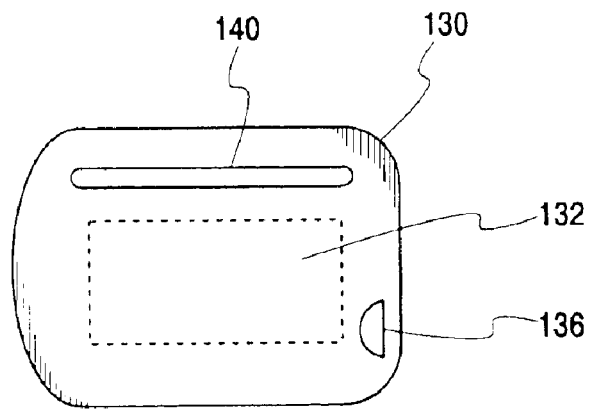
FIG. 9 is a top plan view of the pull out reference of the apparatus.

The physical size of the tape will be one of the factors in determining how many and where to position the indicia. The larger the tape, the more space for indicia and vice-versa. In any event, it is inevitable that some indicia measurements will be left off of the tape. Accordingly, as FIG. 9 illustrates, the present invention has provided for a pullout card or plate 130 with space 132 (on front or back or both) for an offset mulitplier table or additional offset calculations or the like.

Figure 10:
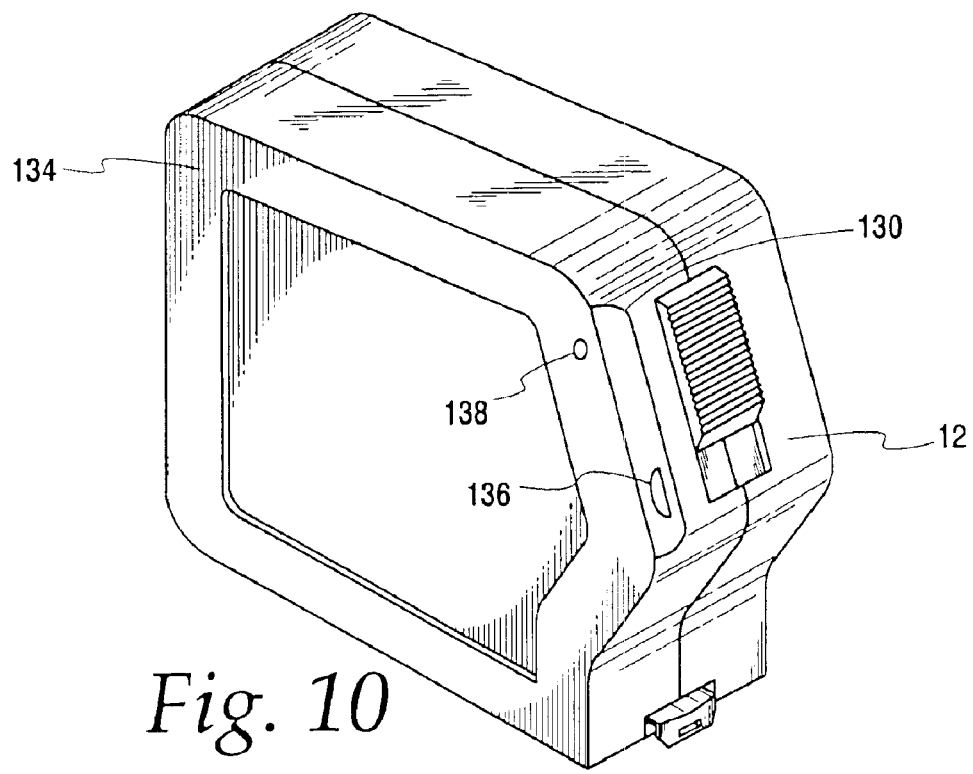
FIG. 10 is a perspective view of an alternate preferred embodiment of the offset tape constructed in accordance with the principles of the present invention illustrating the pullout reference of FIG. 9 in the retracted position.
Figure 11:
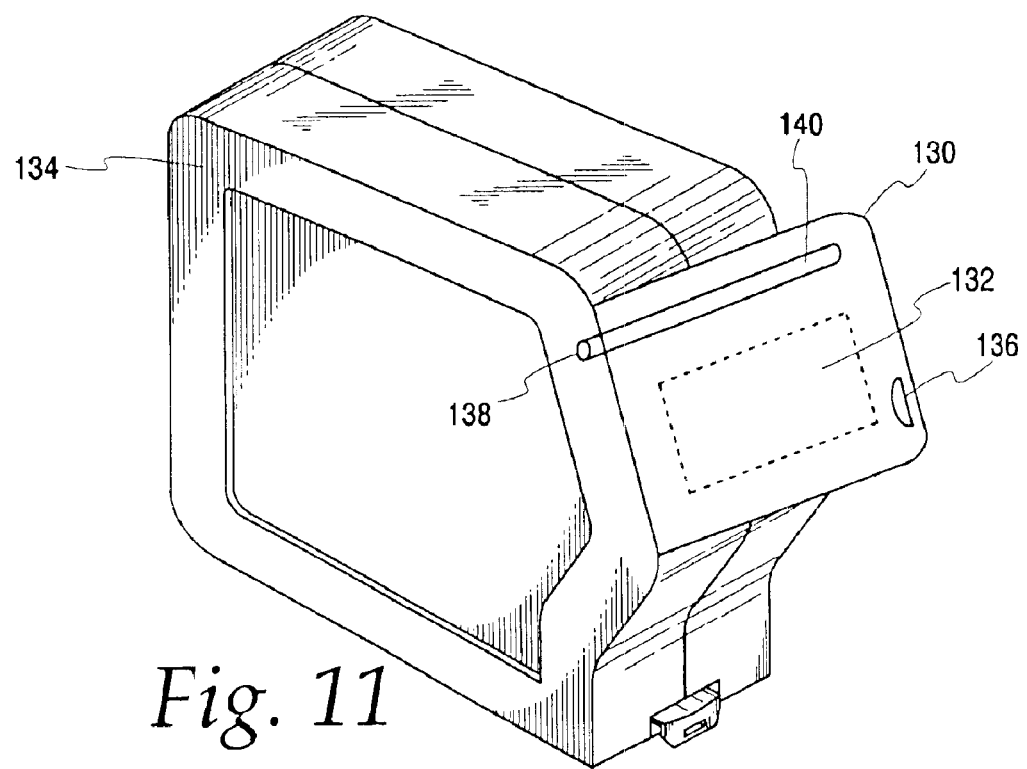
FIG. 11 is a perspective view of an alternate preferred embodiment of the offset tape constructed in accordance with the principles of the present invention illustrating the pullout reference of FIG. 9 in the extended position.

As illustrated by FIGS. 10 and 11, the pullout card 130 is preferably positioned between the tape measure housing 12 and the protective housing cover 134. The housing cover 134 may be a rubber or the like material such that it provides a means of protecting the housing 12 from damage. Alternatively, the reference card 130 may be positioned within the housing 12 itself if no protective cover has been provided. In any event, FIG. 10 shows the card 130 in the retracted position and FIG. 11 shows the card 130 in the extended position. The card is repositioned by simply engaging its tab 136 such that the cover and or housing pin 138 traverses slot 140. When extended outside of the housing/cover, the calculations space 132 becomes ascertainable for the user.

While a particular embodiments of the invention have been shown and described, it will be obvious to those skilled in the art that changes and modifications may be made therein without departing from the invention in its broader aspects, and, therefore, the aim in the appended claims is to cover all such changes and modification as fall within the true spirit and scope of the invention.

We claim:

1. An offset measuring device, comprising:

a measuring strip having an upper surface;

a plurality of numerical instrumental line markers at spaced intervals of a known scale on said upper surface;

a plurality of offset indicia spaced along said markers at measured offset depths and having a plurality of calculated criteria associated therewith; and one of said calculated criteria corresponding to a distance between offset bends and another of said calculated criteria corresponding to an offset angle such that the calculated criteria are aligned with a line marker representative of said calculations.

2. An offset measure as defined in claim 1 further having another calculated criteria corresponding to a conduit shrinkage.

3. An offset measuring device as defined in claim 1 wherein said measuring strip is an elongated planer rectangular configuration.

4. An offset measuring device as defined in claim 3 wherein said measuring strip has a top edge and a bottom edge.

5. An offset measuring device as defined in claim 1 wherein a portion of said line markers include demarcation numerals.

6. An offset measuring device as defined in claim 1 wherein said indicia having multiple sets of calculated criteria associated therewith.

7. An offset measuring device as defined in claim 1 further having a legend on said upper surface of said strip.

8. An offset measuring device as defined in claim 1 wherein said measuring strip is a rolled tape.

9. An offset measuring device as defined in claim 8 wherein said tape in enclosed within a housing including tape rolling means whereby said tape is linearly extendable and retractable from said housing.

10. An offset measuring device as defined in claim 9 wherein said tape includes a flange.

11. An offset measuring device as defined in claim 9 wherein said housing includes a switch in operable communication with said tape rolling means.

12. A method for marking the offset bends of a conduit, comprising of the steps of:

measuring an offset depth;

measuring an offset angle;

marking the conduit for a first bend;

locating an offset indicia on an offset measuring device associated with said measured offset depth and angle; and measuring from the first bend to the line marker of a known scale and representative of and aligned with the calculated criteria corresponding to the distance between bends for the measured offset depth and angle and marking the conduit for a second bend.

13. A measuring strip, comprising:

a readable surface having a plurality of line markers at spaced intervals of a known scale thereon;

indicia spaced along said markers and having representative calculated criteria associated therewith; and one of said calculated criteria corresponding to a distance between bends while another of said calculated criteria corresponding to an offset angle such that the associated indicia is aligned with a line marker and an offset representative of said clculations.

14. A measuring strip as defined in claim 13 wherein said measuring strip is an elongated planer rectangular configuration.

15. A measuring strip as defined in claim 13 wherein said measuring strip has a top edge and a bottom edge.

16. A measuring strip as defined in claim 13 wherein said measuring strip is a rolled tape.

17. A measuring strip as defined in claim 13 wherein said tape is enclosed within a housing including tape rolling means whereby said tape is linearly extendable and retractable from said housing.

18. A measuring strip as defined in claim 13 wherein said tape includes a flange.

19. A measuring strip as defined in claim 13 wherein said housing includes a switch in operable communication with said tape rolling means.

20. An offset measuring device, comprising:

a measuring strip in the form of a rolled tape enclosed within a housing including tape rolling means whereby said tape is linearly extendable and retractable from said housing;

a plurality of offset indicia spaced along said markers; and a calculation reference card coupled to said housing wherein said card includes an operable slot in communication with a housing pin for positioning said card within said housing and extending said card out of said housing.

21. An offset measuring device as defined in claim 20 wherein said card further include a user engageable tab.

* * * * *